(12) United States Patent
Hanya et al.

(10) Patent No.: US 8,146,434 B2
(45) Date of Patent: *Apr. 3, 2012

(54) APPARATUS FOR MEASURING VIBRATION CHARACTERISTICS OF HEAD GIMBAL ASSEMBLY

(75) Inventors: Masao Hanya, Aikoh-gun (JP); Hajime Tada, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 678 days.

This patent is subject to a terminal disclaimer.

(21) Appl. No.: 12/284,406

(22) Filed: Sep. 22, 2008

(65) Prior Publication Data

US 2009/0086375 A1 Apr. 2, 2009

(30) Foreign Application Priority Data

Sep. 28, 2007 (JP) ................................. 2007-256375

(51) Int. Cl.
*G01M 7/00* (2006.01)

(52) U.S. Cl. ................. 73/662; 73/593; 73/597; 73/659

(58) Field of Classification Search .................... 73/662, 73/663, 593, 597, 649, 659
See application file for complete search history.

(56) References Cited

U.S. PATENT DOCUMENTS

| | | | | |
|---|---|---|---|---|
| 4,092,869 A * | 6/1978 | Kimball | .......................... | 73/665 |
| 4,270,390 A * | 6/1981 | Kimball et al. | ................. | 73/663 |
| 4,495,433 A * | 1/1985 | Sheridan | ...................... | 310/329 |
| 4,567,772 A * | 2/1986 | Hudson et al. | .................. | 73/663 |
| 4,620,447 A * | 11/1986 | Kimball | .......................... | 73/662 |
| 4,633,716 A * | 1/1987 | Martin | ........................... | 73/663 |
| 6,947,852 B2* | 9/2005 | Hess et al. | ...................... | 702/56 |
| 7,034,372 B1* | 4/2006 | Kulangara et al. | ............ | 257/415 |
| 7,487,680 B2* | 2/2009 | Hammond et al. | ............. | 73/663 |
| 7,549,340 B2* | 6/2009 | Hanya et al. | ..................... | 73/662 |

FOREIGN PATENT DOCUMENTS

JP 2007-192735 8/2007

* cited by examiner

*Primary Examiner* — Helen C. Kwok
(74) *Attorney, Agent, or Firm* — Jordan and Hamburg LLP (57) ABSTRACT

An apparatus for measuring the vibration characteristics of a head gimbal assembly can grasp resonant characteristics at high frequencies and efficiently measure the vibration characteristics of the head gimbal assembly, the apparatus has a shaker head to which the head gimbal assembly is attached, the shaker head has a main body made of ceramics and a fixture made of metal, the fixture is solidly fixed to the main body and is provided with positioning pins and an internal thread, the head gimbal assembly is supported with a mount block, and the mount block has positioning holes to be fitted to the positioning pins of the fixture and a joined part to be removably fastened to the internal thread of the fixture.

6 Claims, 10 Drawing Sheets

Fig. 8 One-channel measurement (Mode examination of shaker itself)

Fig.11 Two-channel measurement
(Examination of measurable range)

○ Laser Spot (Reference)
● Laser Spot

| | Shaker main mode | Measurable range | Jig mode |
|---|---|---|---|
| Embodiment | 56kHz | <65kHz | >30kHz |
| Comparative example | 32kHz | <40kHz | <25kHz |

Fig.20
RELATED ART

APPARATUS FOR MEASURING VIBRATION CHARACTERISTICS OF HEAD GIMBAL ASSEMBLY

BACKGROUND OF THE INVENTION

1. Field of the Invention

The present invention relates to an apparatus for measuring the vibration characteristics, in particular operating resonant characteristics of a head gimbal assembly that is installed in a hard disk drive (HDD) incorporated in an information processing unit such as a computer.

2. Description of Related Art

The head gimbal assembly includes a head suspension and a slider to read and write a hard disk in a hard disk drive. The head gimbal assembly is oscillated at high frequencies with a voice coil motor (VCM), to move the slider from one track to another on the hard disk, or make the slider follow a track of the hard disk. To secure such operation of the head gimbal assembly, it is important to grasp the resonant characteristics of the head gimbal assembly.

There is a need of an apparatus capable of efficiently measuring head gimbal assemblies one after another for their resonant characteristics.

Recent HDDs read positioning signals at high sampling frequencies to improve positioning accuracy. Head gimbal assemblies employed for such HDDs must more accurately be measured for their resonant characteristics.

Figure 20:
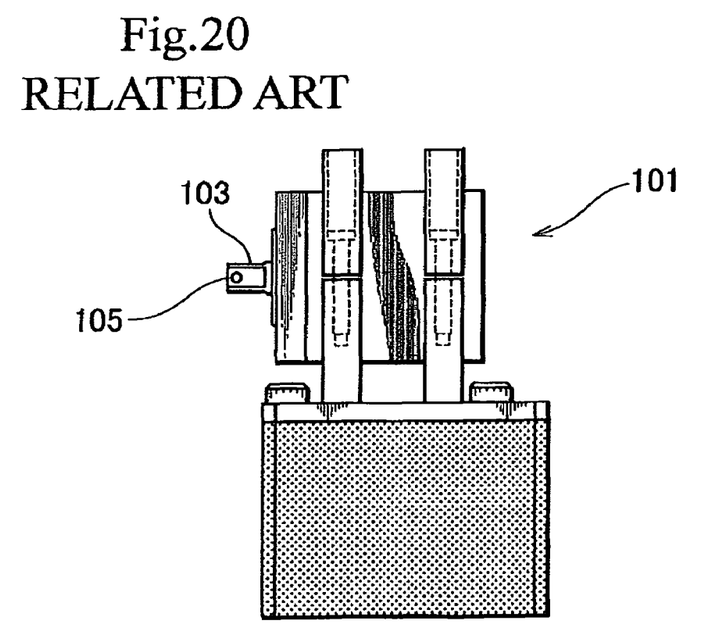
FIG. 20 is a side view showing a shaker of an apparatus for measuring the vibration characteristics of a head gimbal assembly according to a related art.

FIG. 20 shows an apparatus for measuring the resonant characteristics of a head gimbal assembly according to a related art. In FIG. 20, the apparatus has a shaker 101 to which a head gimbal assembly to be measured is attached. The shaker 101 has a shaker head 103 protruding outwardly. The shaker head 103 is a lightweight cylinder made of ceramics which is light. The shaker head 103 is provided with a threaded portion 105 for attaching the head gimbal assembly.

In order to measure the resonant characteristics, the head gimbal assembly is attached to the shaker head 103 by fastening a screw to the threaded portion 105. The shaker head 103 is light because it is made of ceramics, and therefore, is capable of measuring the head gimbal assembly at high frequencies.

According to the related art, a head gimbal assembly which is usually very small must individually be screwed to the shaker head 103. The fastening and unfastening of a head gimbal assembly to and from the shaker head 103 is laborious to limit the number of head gimbal assemblies to be measured. Accordingly, the related art is applicable only for a laboratory purpose and is hardly applicable for a manufacturing line.

Namely, the shaker head 103 made of ceramics is light and may be effective for measuring a head gimbal assembly at high frequencies. It, however, is inefficient to measure many head gimbal assemblies one after another.

The above-mentioned and other related arts are disclosed in Japanese Unexamined Patent Application Publication No. 2007-192735 and EMIC Corporation Catalogue No. 90201.

SUMMARY OF THE INVENTION

An object of the present invention is to provide an apparatus for measuring the vibration characteristics of a head gimbal assembly, capable of accurately and efficiently measuring the vibration characteristics, in particular the resonant characteristics of the head gimbal assembly.

In order to accomplish the object, an aspect of the present invention provides an apparatus for measuring the vibration characteristics of a head gimbal assembly, having a shaker head and mount block. The shaker head includes a main body made of light material and a fixture solidly joined with the main body. The mount block is configured to hold the head gimbal assembly. The mount block is positioned and attached to the fixture. Positioning parts are formed on the fixture and mount block, respectively. The positioning parts are positioned with each other to position the mount block to the fixture. A joining part is formed on the fixture and a joined part is formed on the mount block. The joined part of the mount block is removably joined with the joining part of the fixture to detachably attach the mount block to the fixture.

According to this aspect, the shaker head is made of light material such as ceramics to increase the resonant frequency and measurable resonant frequencies of the apparatus. The mount block for supporting the head gimbal assembly is detachable from the fixture of the shaker head so that the head gimbal assembly may easily be replaced with another for measurement. This configuration greatly improves the efficacy of measurement of head gimbal assemblies.

DETAILED DESCRIPTION OF EMBODIMENTS

Figure 1:
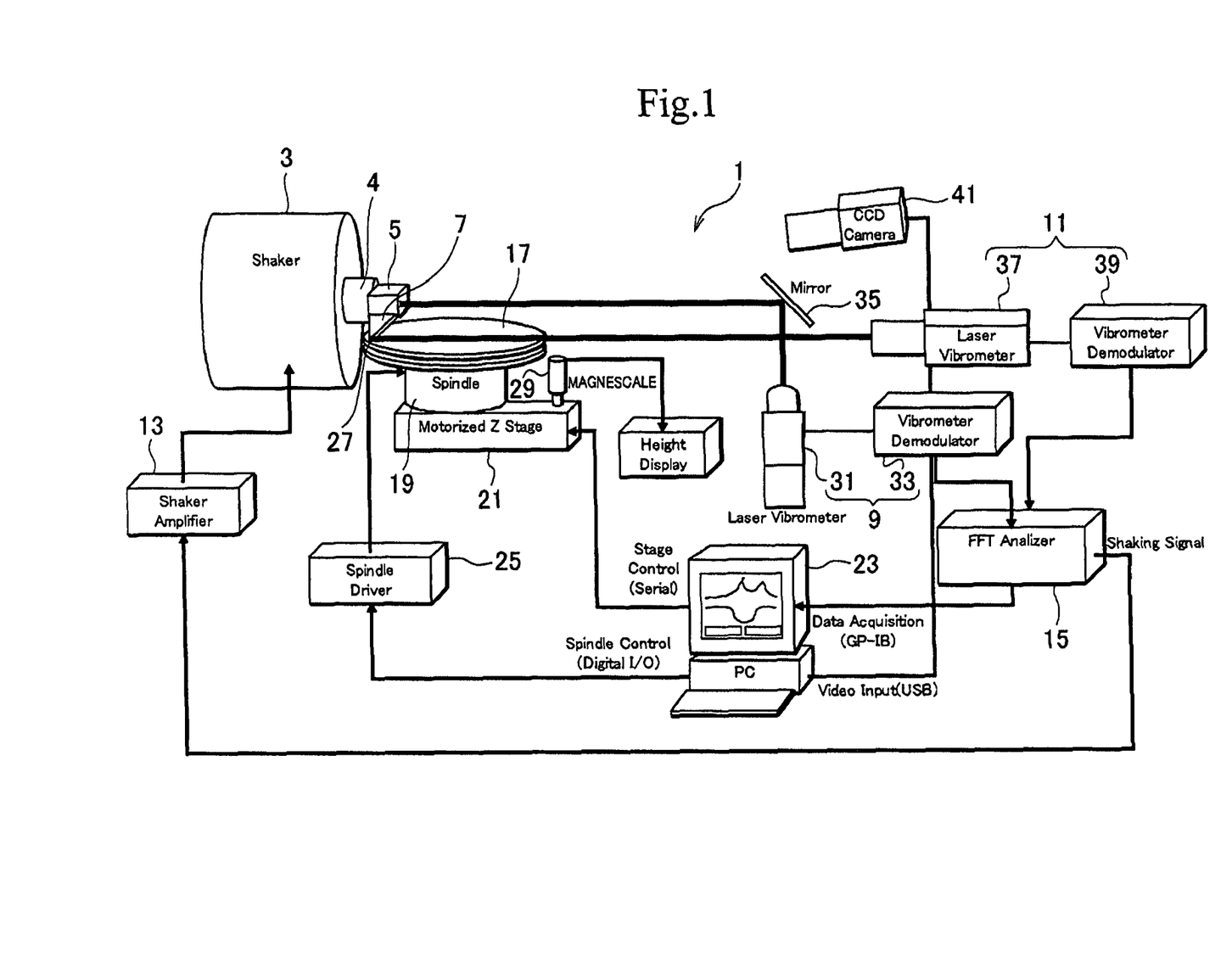
FIG. 1 is a block diagram showing an apparatus for measuring the vibration characteristics of a head gimbal assembly according to an embodiment of the present invention.

FIG. 1 is a block diagram showing an apparatus for measuring the vibration characteristics of a head gimbal assembly according to an embodiment of the present invention.

In FIG. 1, the apparatus 1 has a shaker 3 to produce vibration. The shake 3 has a shaker head 4 that vibrates. The shaker head 4 has a mount block 5 to which the head gimbal assembly 7 is attached. The vibration characteristics of the head gimbal assembly 7 are measured with the use of first and second laser Doppler vibrometers 9 and 11.

The shaker 3 is connected to a shaker amplifier 13 that receives a shaking signal from an FFT (Fast Fourier Transform) analyzer 15, to shake the mount block 5.

The head gimbal assembly 7 is arranged on a disk 17 that is turned by a spindle motor 19. The motor 19 is arranged on a stage 21 and is driven by a driver 25 under the control of a personal computer 23.

The stage 21 is vertically adjustable under the control of the personal computer 23, to change the Z-height of a head 27 of the head gimbal assembly 7. The stage 21 is provided with a displacement gauge 29 to directly measure the Z-height.

The first laser Doppler vibrometer 9 detects a vibration velocity of the mount block 5 and sends the detected data to the FFT analyzer 15. The vibrometer 9 has a probe 31 and a Doppler vibrometer 33. The probe 31 emits a laser beam that is orthogonal to the mount block 5. Between the probe 31 and the mount block 5, there is a mirror 35 serving as a reflector to orthogonally reflect the laser beam from the probe 31 toward the mount block 5.

The second laser Doppler vibrometer 11 detects a vibration velocity of a slider of the head 27 of the head gimbal assembly 7 and sends the detected data to the FFT analyzer 15. The vibrometer 11 has a probe 37 and a Doppler vibrometer 39. The probe 37 emits a laser beam toward a side face of the slider. The laser-beam-irradiated position on the slider side face is photographed by a CCD camera 41 that is controlled by the personal computer 23. Image data from the CCD camera 41 is sent to the personal computer 23.

Instead of the first laser Doppler vibrometer 9, the second laser Doppler vibrometer 11 may orthogonally be arranged relative to the slider, so that the mirror may reflect a laser beam from the vibrometer 11 toward the slider. Alternatively, the first and second laser Doppler vibrometers 9 and 11 may orthogonally be arranged relative to the measuring objects so that mirrors may reflect laser beams from the vibrometers 9 and 11 toward the objects.

The FFT analyzer 15 is controlled by the personal computer 23, receives analog measurement data from the Doppler vibrometers 33 and 39, converts the analog data in a time domain into digital data in a frequency domain, and calculates a transfer function. The transfer function is stored in the personal computer 23. The FFT analyzer 15 outputs a shaking signal to the shaker 3.

Based on vibration data provided by the first and second laser Doppler vibrometers 9 and 11, the FFT analyzer 15 provides numeric data related to the gain and phase difference of the slider of the head 27 with respect to the shaker 3. The numeric data is used to obtain a resonant characteristic of the head gimbal assembly 7.

Figure 2:
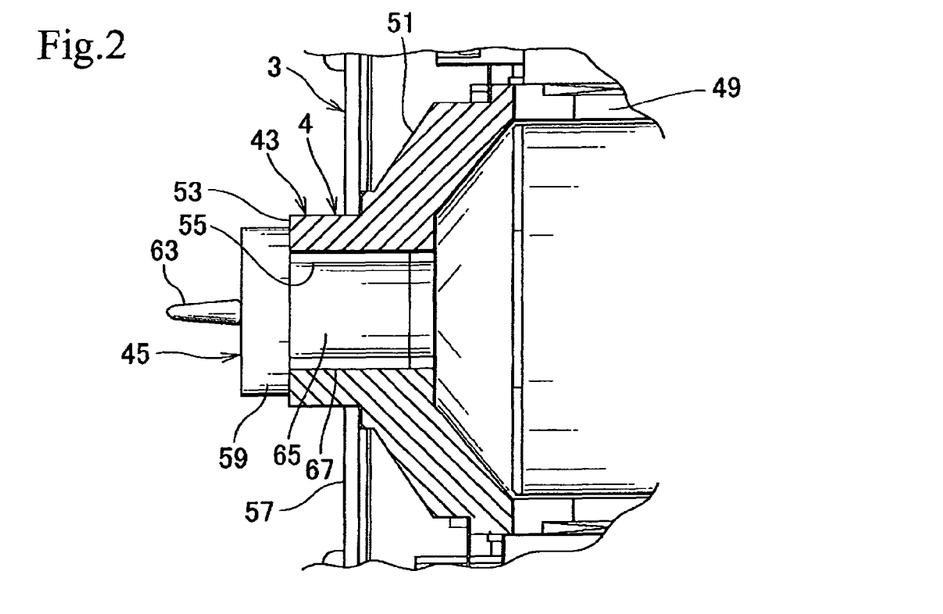
FIG. 2 is a sectional view showing a shaker head of the apparatus of FIG. 1.
Figure 3:
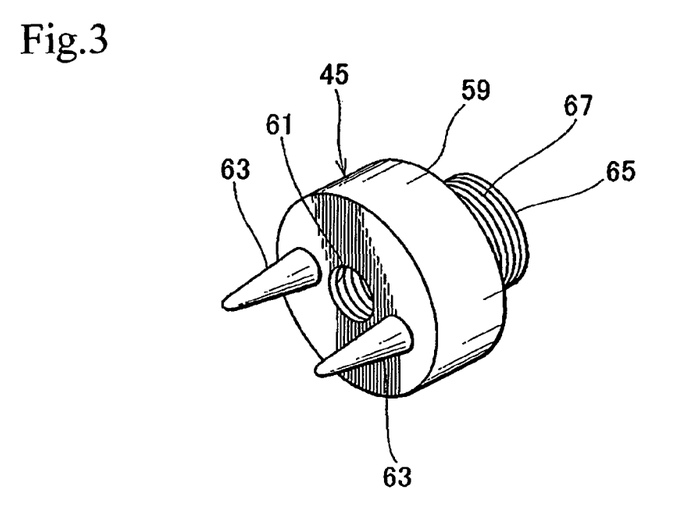
FIG. 3 is a perspective view showing a fixture attached to the shaker head of FIG. 2.

The shaker head 4 will be explained with reference to FIGS. 2 and 3 in which FIG. 2 is a sectional view showing the shaker head 4 and FIG. 3 is a perspective view showing a fixture 45 attached to the shaker head 4.

In FIG. 2, the shaker head 4 of the shaker 3 includes a main body 43 and the fixture 45.

The main body 43 of the shaker head 4 is integral with an end of a lightweight movable cylinder 49 made of light material such as ceramics. The main body 43 includes a hollow tapered part 51 and a boss 53 formed at a front end of the tapered part 51. The tapered part 51 is shaped to secure lightness and strength. The boss 53 is solidly joined with the fixture 45 and has an internal thread 55 that is a fine screw thread on an inner circumferential surface thereof. An end of the boss 53 protrudes from a housing 57 of the shaker 3.

In FIGS. 2 and 3, the fixture 45 has a fixture body 59 that is a cylinder solid made of stainless steel (SUS). An end of the fixture body 59 has an internal thread 61 serving as a joining part. On each side of a front end of the internal thread 61, positioning pins 63 project to serve as one of positioning parts. The other end of the fixture body 59 has a joint shaft 65 protruding from the other end of the fixture body 59 to engage with the boss 53. The periphery of the joint shaft 65 is provided with an external thread 67 that is a fine screw thread.

The fixture 45 is fixed to the boss 53 of the main body 43 of the shaker head 4 by fastening the external thread 67 of the joint shaft 65 to the internal thread 55. Between the internal thread 55 and the external thread 67, an adhesive is applied not to turn the threads 55 and 67 relative to each other.

After the fixture 45 is solidly fastened and adhered to the main body 43 of the shaker head 4, the shaker 3 is fixed to a jig on a surface plate. The shaker 3 is slightly released from the jig and is turned around an axis, to horizontally set the positioning pins 63 of the fixture 45. Thereafter, the shaker 3 is fixed to the jig.

For the vibration-characteristic measuring apparatus 1, it is very important to horizontally set the first and second laser Doppler vibrometers 9 and 11, mirror 35, shaker 3, and the like, to secure measurement accuracy. Due to this, they are assembled on the surface plate.

As a result of the setting of the shaker 3, the horizontal position of the fixture 45 with respect to the shaker head 4 is adjusted on the surface plate with the use of the jig to which the shaker 3 is fixed.

Figure 4:
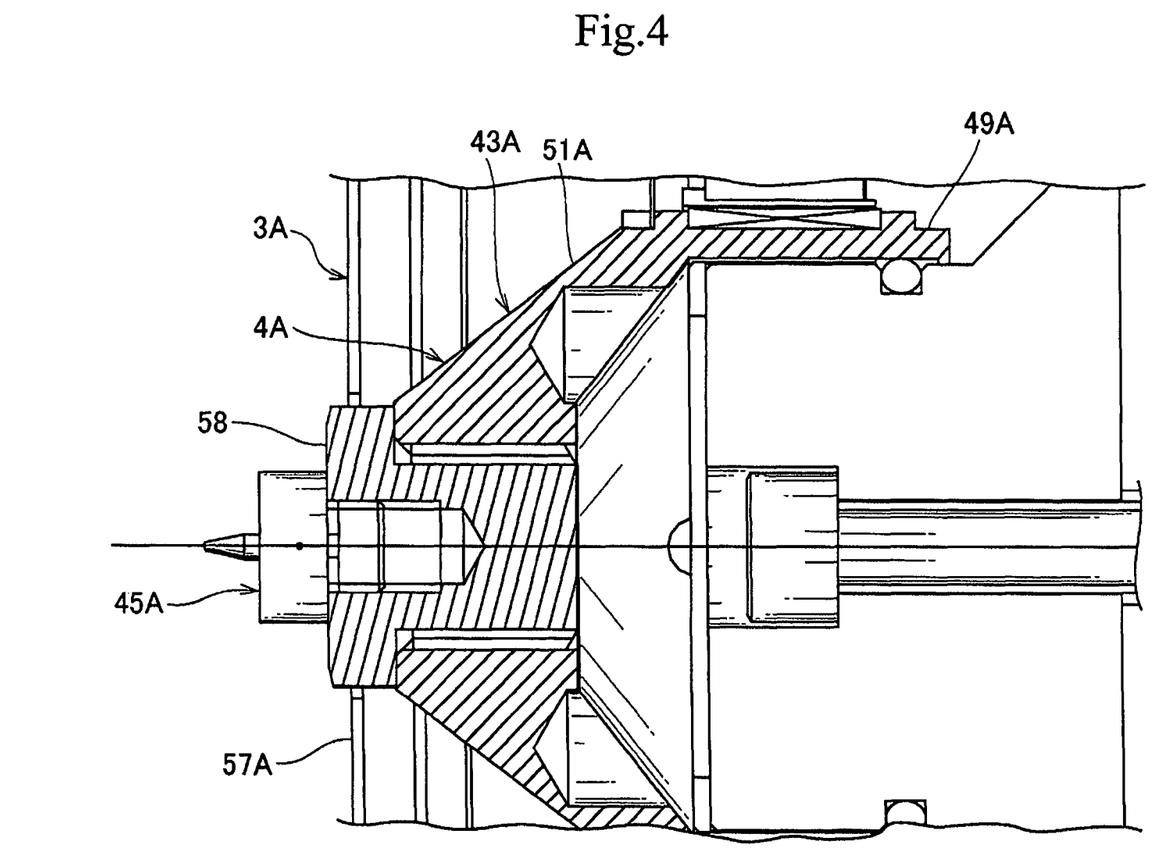
FIG. 4 is a sectional view showing a shaker head according to a comparative example.

FIG. 4 shows a shaker head according to a comparative example devised by the applicant of the present invention. In FIG. 4, parts corresponding to those of FIG. 2 are represented with the same reference marks plus "A."

The comparative example of FIG. 4 improves the efficacy of the related art of FIG. 20 employing the shaker 101 and ceramic shaker head 103. In FIG. 4, a fixture 45A is made of stainless steel and is removably attached to a main body 43A of the shaker head 4A. To enable the attaching and detaching of the fixture 45A to and from the main body 43 of the shaker head 4A, the shaker head 4A is provided with an adaptor 58 made of stainless steel.

A head gimbal assembly is set on a mount block, the mount block is positioned and fixed to the fixture 45A with a bolt, and the fixture 45A is attached to the adaptor 58.

This configuration allows a very small head gimbal assembly to be handled with a jig (the mount block and fixture). Namely, the comparative example can measure many head gimbal assemblies one after another by assembling each head gimbal assembly and a mount block into a set and by attaching and detaching the sets to and from the measuring apparatus one after another.

Attaching the stainless steel adaptor 58 to the ceramic main body 43A of the shaker head 4A is disadvantageous because the metal adaptor 58 is heavy to deteriorate a measurable frequency range.

Measurable frequency ranges (shaker mode) of the present invention and comparative example will be explained later.

Figure 5:
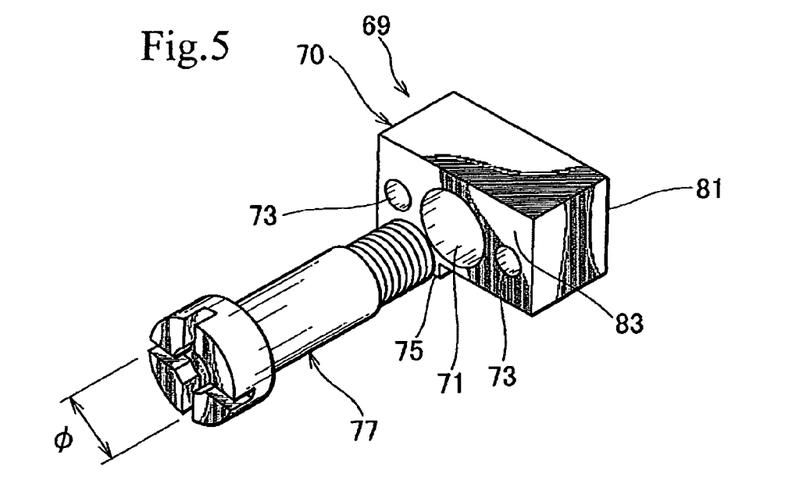
FIG. 5 is a perspective view showing a mount block attached to the fixture of FIG. 3.
Figure 6:
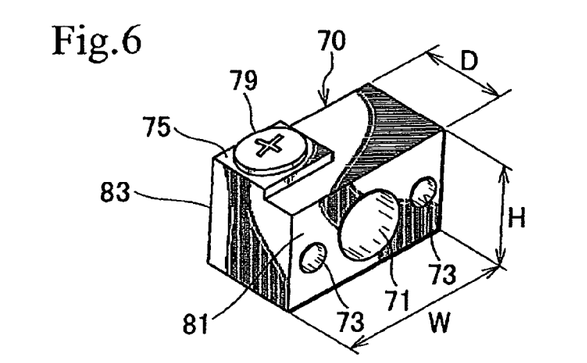
FIG. 6 is a perspective view showing a clamping part of the mount block of FIG. 5.

FIGS. 5 and 6 show a mount block 69 according to the embodiment of the present invention, in which FIG. 5 is a perspective view showing the mount block 69 and FIG. 6 is a perspective view showing a clamping part 75 of the mount block 69. The mount block 69 is fitted to the fixture 45 of FIGS. 2 and 3.

In FIG. 5, the mount block 69 has a rectangular parallelepiped block body 70 made of, for example, stainless steel (SUS). The block body 70 has a joining hole 71, positioning holes 73 serving as other of positioning parts, and the clamping part 75. The joining hole 71 passes a bolt 77 serving as a joined part. The positioning holes 73 guide the positioning pins 63 of the fixture 45 and engage with the same. The clamping part 75 has a screw 79 with which the head gimbal assembly 7 (FIG. 1) is attached to the clamping part 75. The clamping part 75 protrudes from a bottom surface of the mount block 69, is away from a surface 81 that is attached to the fixture 45, and is close to a free end surface 83 that is opposite to the surface 81.

The head gimbal assembly 7 is attached to the clamping part 75 of the mount block 69, and the mount block 69 is attached to the fixture 45 with the positioning holes 73 of the mount block 69 being fitted to the positioning pins 63 of the fixture 45. The bolt 77 is inserted into the joining hole 71 and is fastened to the internal thread 61 of the fixture 45.

In this way, the mount block 69 is positioned with respect to the fixture 45 and is fixed thereto.

The mount block 69 is shaped as small as possible. This will be explained in comparison with a comparative example devised by the applicant of the present invention shown in FIG. 7. Parts of FIG. 7 corresponding to those of FIG. 6 are represented with the same reference marks plus "A."

Figure 7:
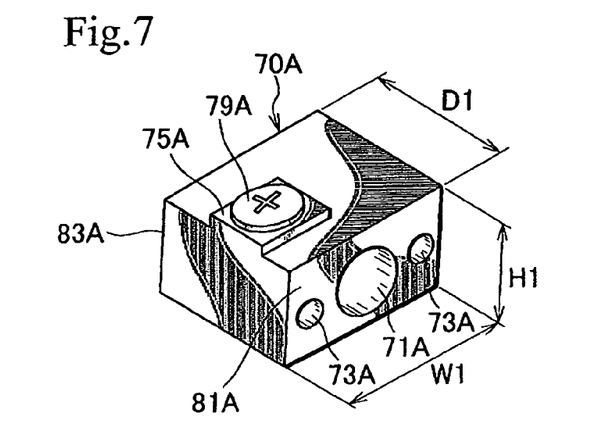
FIG. 7 is a perspective view showing a clamping part of a mount block according to the comparative example.

A block body 70A of the comparative example shown in FIG. 7 has a clamping part 75A which is arranged between an attaching face 81A and a free end face 83A. According to the embodiment of FIG. 6, the block body 70 is cut on the free end face 83 beside the clamping part 75. As a result, a depth D of the block body 70 is shorter than a depth D1 of the block body 70A. Also, width W and height H of the block body 70 are shorter than width W1 and height H1 of the block body 70A.

More precisely, the block body 70A of the comparative example has D1=7 mm, H1=6.73 mm, and W1=11.8 mm and the block body 70 of the embodiment has D=6.7 mm, H=6 mm, and W=10 mm. The diameter of a fastening bolt for the mount block of the comparative example is 4.5 mm while that of the bolt 77 for the mount block 69 of the embodiment is 4 mm.

The resonant characteristics (jig modes) of the mount blocks of the embodiment and comparative example will be explained later.

Figure 8:
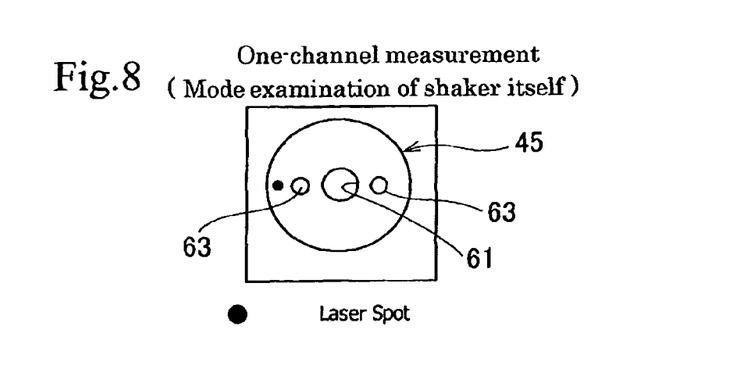
FIG. 8 is a view showing a one-channel laser spot used to measure a shaker mode of a vibration-characteristic measuring apparatus.

FIG. 8 shows a one-channel laser spot used to measure a shaker mode. In FIG. 8, a dot represents the laser spot.

Figure 9:
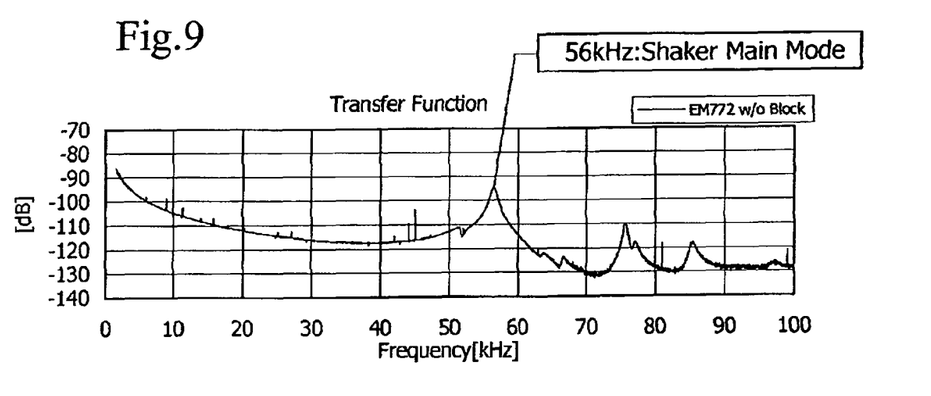
FIG. 9 is a graph showing a transfer function of the apparatus according to the embodiment of FIG. 1.
Figure 10:
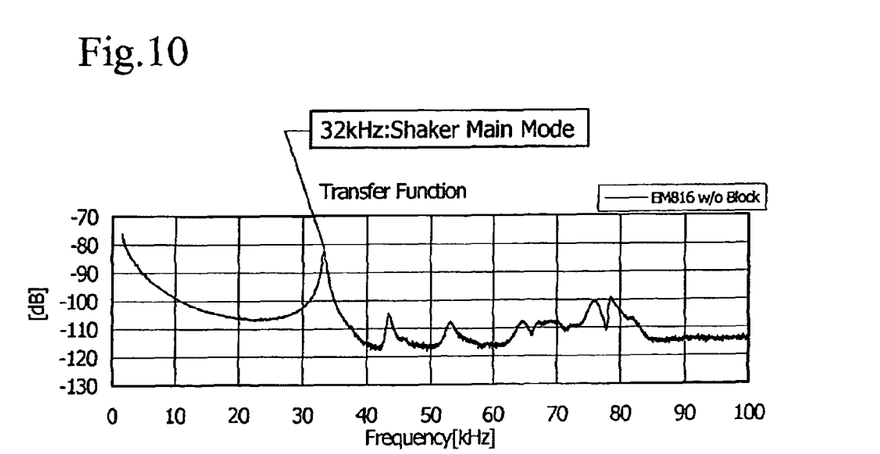
FIG. 10 is a graph showing a transfer function of a comparative example.

FIG. 9 is a graph showing a transfer function of the shaker according to the embodiment of FIG. 1 and FIG. 10 is a graph showing a transfer function of a comparative example employing the shaker head 4A of FIG. 4. Both the graphs are obtained based on the laser beam shown in FIG. 8.

The embodiment shown in FIG. 9 demonstrates a shaker main mode at 56 kHz and the comparative example shown in FIG. 10 demonstrates a shaker main mode at a lower frequency of 32 kHz.

Figure 11:
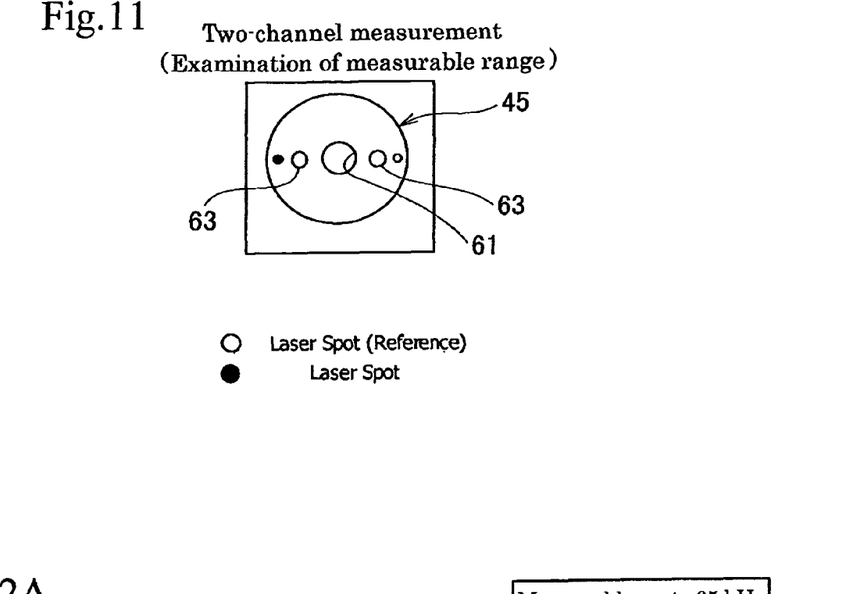
FIG. 11 is a view showing two-channel laser spots used to measure a shaker mode of a vibration-characteristic measuring apparatus.

FIG. 11 shows two-channel laser spots used to measure a shaker mode and a measurable range. In FIG. 11, black and white dots represent the laser spots.

Figure 12A:
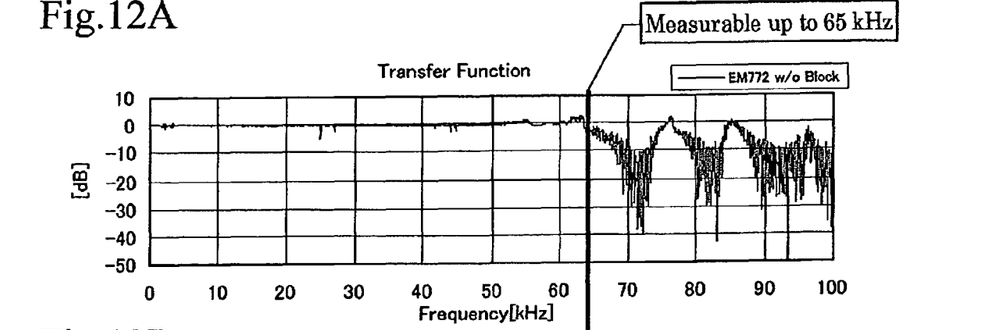
FIG. 12A is a graph showing a transfer function of the embodiment.
Figure 12B:
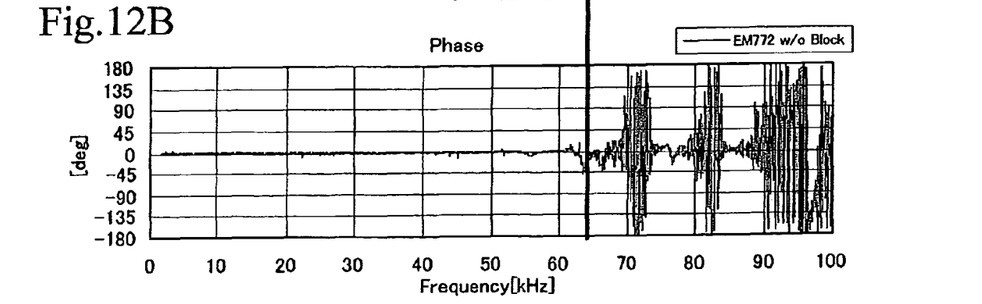
FIG. 12B is a graph showing a phase characteristic of the embodiment.
Figure 13A:
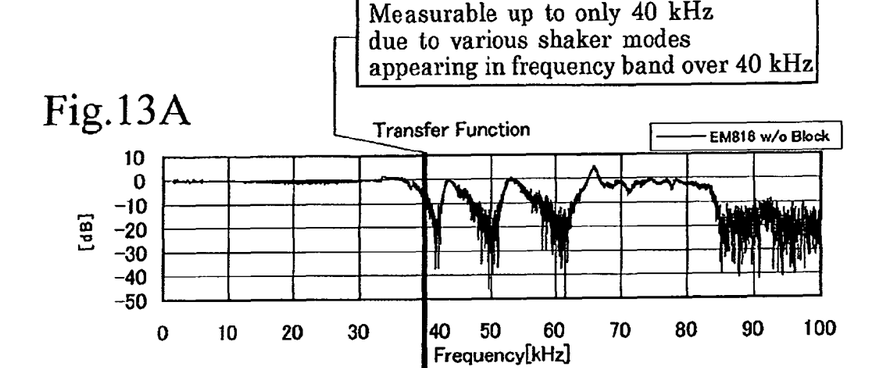
FIG. 13A is a graph showing a transfer function of the comparative example.
Figure 13B:
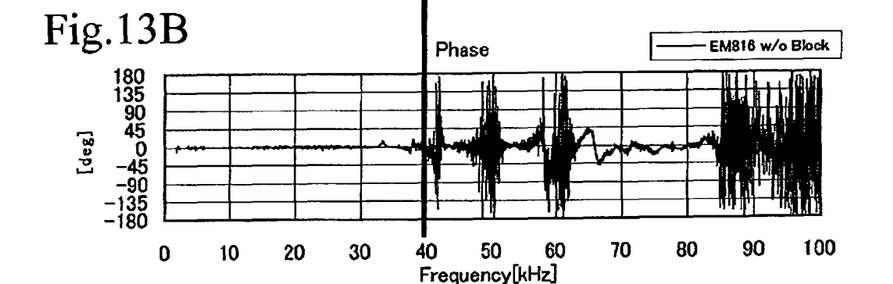
FIG. 13B is a graph showing a phase characteristic of the comparative example.

FIG. 12A is a graph showing a transfer function of the shaker according to the embodiment and FIG. 12B is a graph showing a phase characteristic of the same. FIG. 13A is a graph showing a transfer function of the shaker according to the comparative example and FIG. 13B is a graph showing a phase characteristic of the same. Each graph is obtained based on the laser beams shown in FIG. 11.

From the graphs of FIGS. 9 to 13, it is understood that the comparative example involves various shaker modes in a frequency band above 40 kHz to disable measurements at frequencies above 40 kHz and that the embodiment can achieve measurements up to 65 kHz.

Figure 14:
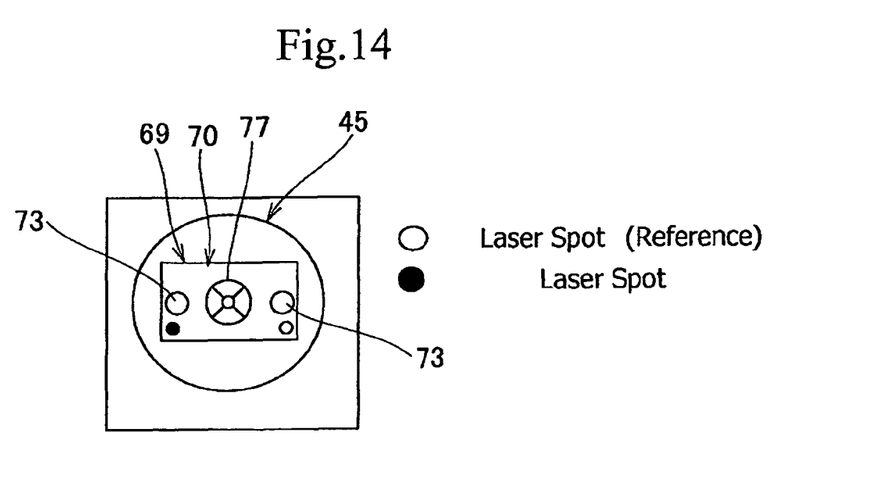
FIG. 14 is a view showing two-channel laser spots used to measure a jig mode of a vibration-characteristic measuring apparatus.

FIG. 14 is a view showing two-channel laser spots used to measure a jig mode. In FIG. 14, black and white dots represent the laser spots.

Figure 15A:
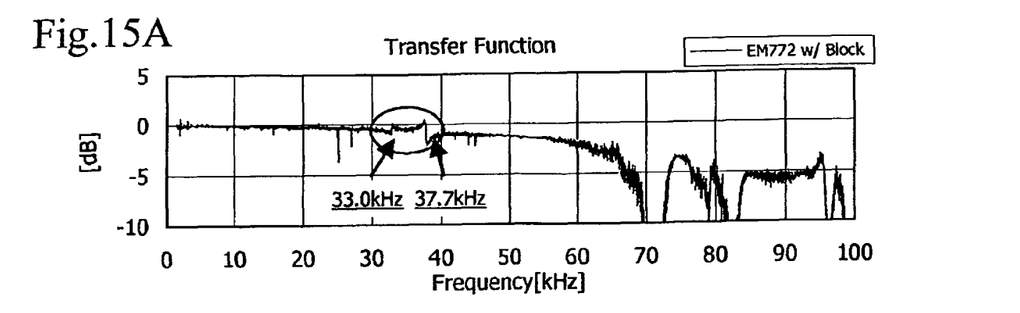
FIG. 15A is a graph showing a jig mode appearing in a transfer function of the embodiment.
Figure 15B:
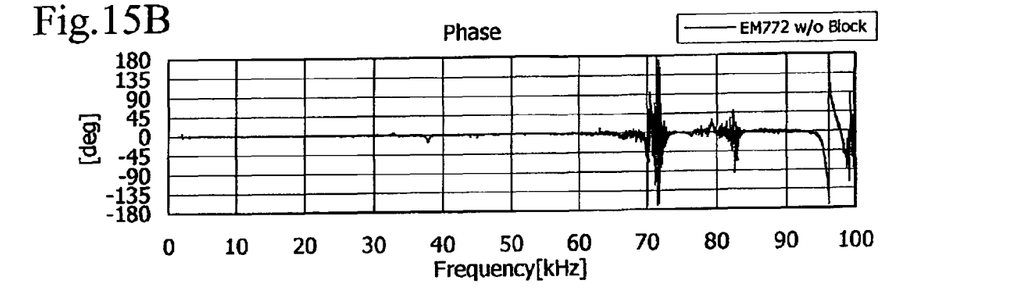
FIG. 15B is a graph showing a phase characteristic of the embodiment.
Figure 16A:
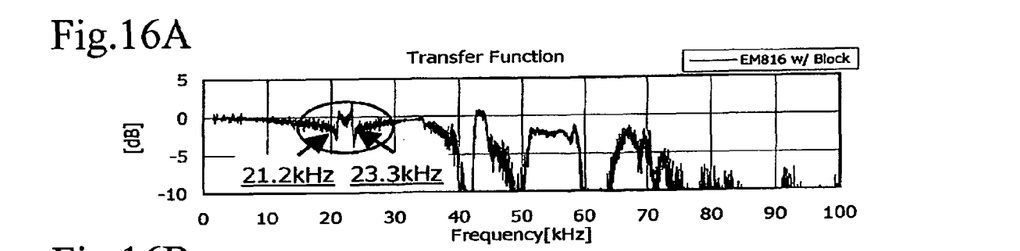
FIG. 16A is a graph showing a jig mode appearing in a transfer function of the comparative example.
Figure 16B:
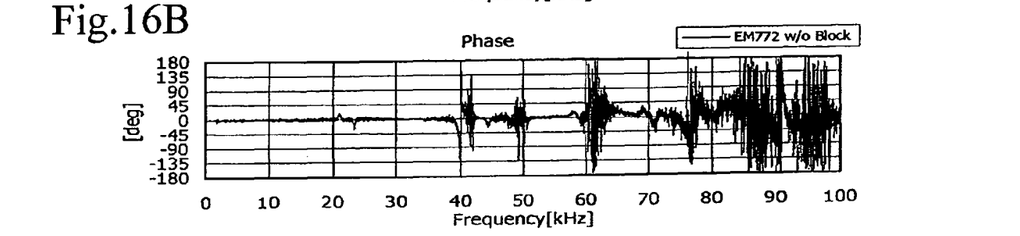
FIG. 16B is a graph showing a phase characteristic of the comparative example.

FIG. 15A is a graph showing a jig mode appearing in a transfer function of the embodiment employing the mount block of FIG. 6 and FIG. 15B is a graph showing a phase characteristic of the same. FIG. 16A is a graph showing a jig mode appearing in a transfer function of the comparative example employing the mount block of FIG. 7 and FIG. 16B is a graph showing a phase characteristic of the same. Each graph is obtained based on the laser beams shown in FIG. 14.

It is understood from the graphs of FIGS. 15 and 16 that the comparative example demonstrates a jig mode at 20 to 25 kHz (21.2 kHz and 23.3 kHz) and that the embodiment demonstrates no jig mode at frequencies up to about 30 kHz (33.3 kHz and 37.7 kHz). Namely, the frequency where the embodiment shows a jig mode is about 10 kHz higher than that of the comparative example.

A head gimbal assembly generally shows a main mode at a frequency below 27 kHz, and therefore, it is understood that the mount block 69 of the embodiment can properly measure the vibration characteristics of a given head gimbal assembly.

Figure 17A:
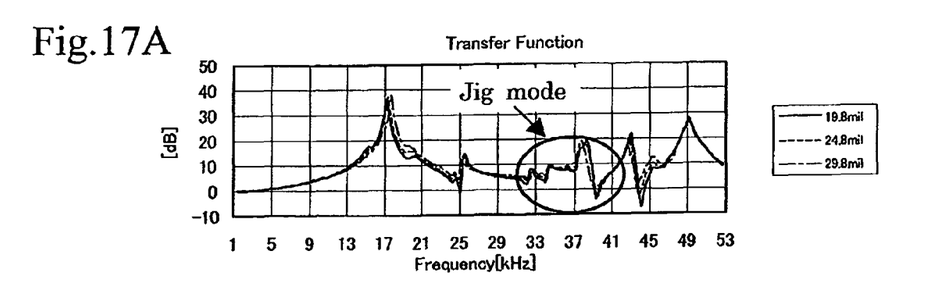
FIG. 17A is a graph showing a resonant characteristic of a head gimbal assembly No. 1 measured with the apparatus of the embodiment.
Figure 17B:
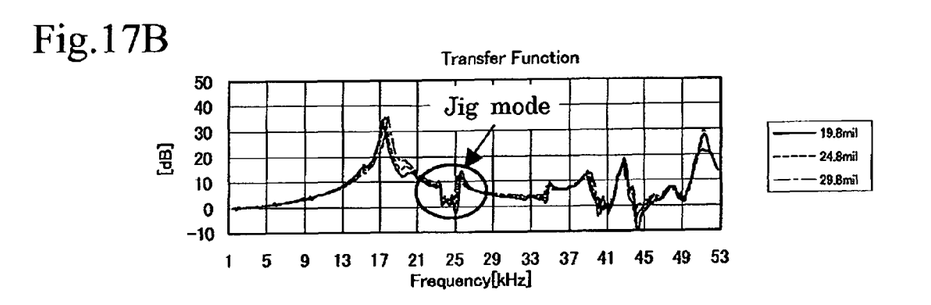
FIG. 17B is a graph showing a resonant characteristic of the head gimbal assembly No. 1 measured with the apparatus of the comparative example.

FIG. 17A is a graph showing a resonant characteristic of a head gimbal assembly No. 1 measured with the apparatus of the embodiment and FIG. 17B is a graph showing a resonant characteristic of the head gimbal assembly No. 1 measured with the apparatus of the comparative example.

Figure 18A:
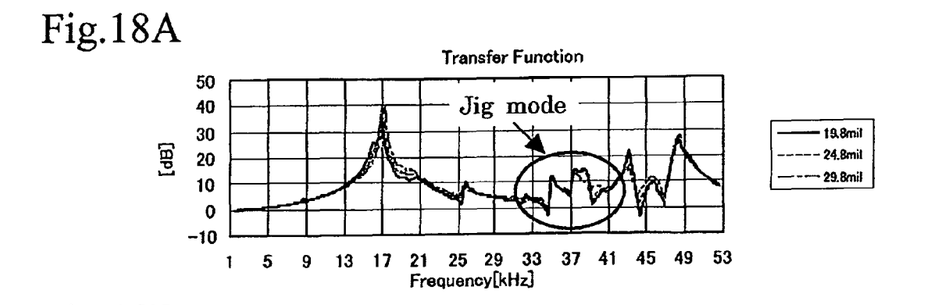
FIG. 18A is a graph showing a resonant characteristic of a head gimbal assembly No. 2 measured with the apparatus of the embodiment.
Figure 18B:
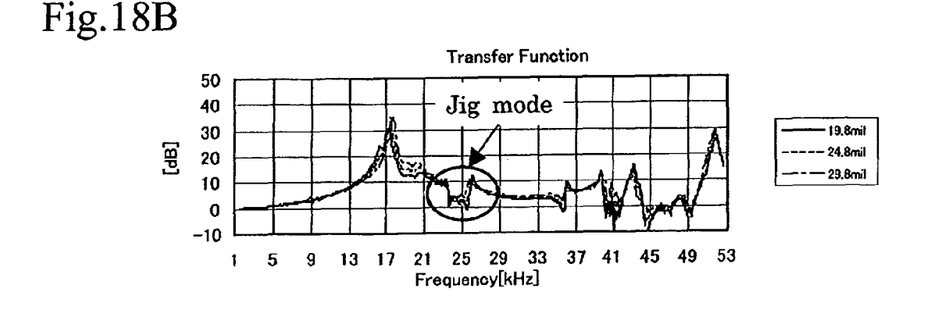
FIG. 18B is a graph showing a resonant characteristic of the head gimbal assembly No. 2 measured with the apparatus of the comparative example.

FIG. 18A is a graph showing a resonant characteristic of a head gimbal assembly No. 2 measured with the apparatus of the embodiment and FIG. 18B is a graph showing a resonant characteristic of the head gimbal assembly No. 2 measured with the apparatus of the comparative example.

According to the comparative example of FIGS. 17B and 18B, a jig mode at most appears at around 25 kHz to influence a sway frequency of the head gimbal assembly around 25 kHz.

According to the embodiment of FIGS. 17A and 18A, a jig mode appears at a frequency above 30 kHz. Namely, the jig mode of the embodiment never influences the sway frequency of the head gimbal assembly around 25 kHz.

Figure 19:
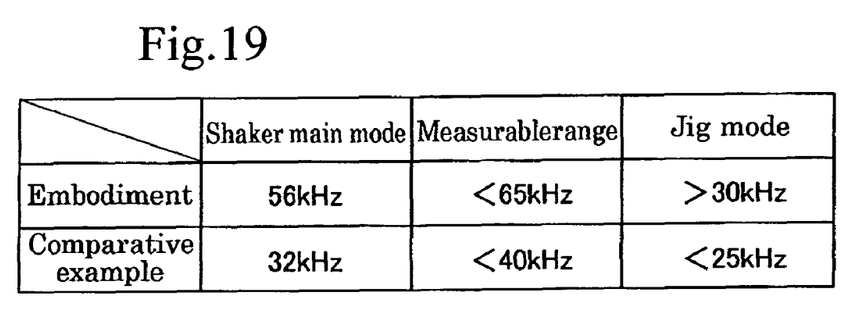
FIG. 19 is a table showing a summary of the resonant characteristics shown in the graphs of FIGS. 9 to 18.

FIG. 19 is a table showing a summary of the resonant characteristics shown in the graphs of FIGS. 9 to 18 measured with the apparatus of the embodiment and the apparatus of the comparative example that employs the shaker head of FIG. 4 and the mount block of FIG. 7.

As is apparent in FIG. 19, the apparatus 1 according to the embodiment demonstrates a shaker main mode at 56 kHz, a measurable range up to 65 kHz, and a jig mode above 30 kHz.

On the other hand, the comparative example demonstrates a shaker main mode at 32 kHz, a measurable range up to 40 kHz, and a jig mode below 25 kHz.

It is concluded, therefore, that the apparatus 1 according to the embodiment can properly cope with high sampling frequencies (about 60 kHz) of recent HDDs and high modes (about 27 kHz) of recent head gimbal assemblies.

Effect of the embodiment of the present invention will be summarized.

As mentioned above, the apparatus for measuring the vibration characteristics of a head gimbal assembly according to the embodiment includes the shaker head 4 to which the head gimbal assembly 7 is attached. The shaker head 4 has the main body 43 made of ceramics and the fixture 45 made of metal. The fixture 45 is solidly joined with the main body 43 and has the positioning pins 63 serving as one of positioning parts and internal thread 61 serving as a joining part. The apparatus also includes the mount block 69 having the positioning holes 73 serving as other of positioning parts and joining hole 71 for the bolt 77 serving as a joined part, to hold the head gimbal assembly 7 and be positioned and attached to the fixture 45 with the positioning holes 73 being positioned with respect to the positioning pins 63 of the fixture 45 and the bolt 77 being removably joined with the internal thread 61 of the fixture 45.

The shaker head 4 is made of ceramics, and therefore, is light to increase the resonant frequency of the apparatus 1 so that the apparatus 1 can measure a wide range of resonant characteristics. The mount block 69 for supporting the head gimbal assembly 7 is attached to and detached from the fixture 45, so that many head gimbal assemblies can easily be replaced from one to another and measured. This greatly improves the efficacy of measuring head gimbal assemblies.

The fixture 45 is solidly adhered to the main body 43 of the shaker head 4.

This configuration secures the measuring of resonant characteristics at high frequencies and improves the efficacy of measurement.

The fixture 45 may be joined with the boss 53 of the main body 43 of the shaker head 4 through splines not to rotate relative to the main body 43.

This configuration secures the positioning of the mount block 69 with respect to the shaker head 4.

The apparatus 1 includes the first laser Doppler vibrometer 9 to detect a vibration velocity of the shaker 3, the second laser Doppler vibrometer 11 to detect a vibration velocity of the head 27 of the head gimbal assembly 7, and the mirror 35 to reflect a laser beam emitted from at least one of the first and second laser Doppler vibrometers 9 and 11 into an orthogonal direction. The apparatus 1 finds the vibration characteristics of the head gimbal assembly 7 according to the detected vibration velocities.

This configuration eliminates the need of an acceleration censor to be attached to the fixture 45 when detecting the vibration of the shaker 3. As a result, this configuration expands the degree of freedom of the size, shape, and material of the apparatus 1. Even if the head gimbal assembly 7 has a high resonant frequency, the resonant frequency of the apparatus 1 will not overlap the resonant frequency of the head gimbal assembly 7, so that the apparatus can surely measure the vibration characteristics of the head gimbal assembly 7.

The joint shaft 65 of the fixture 45 may be fixed with the boss 53 of the main body 43 of the shaker head 4 only by adhesion.

The fixture 45 may have a rectangular parallelepiped shape.

The fixture 45 may have positioning holes and the mount block 69 may have positioning pins engaging with the positioning holes of the fixture 45.

The fixture 45 may have an integrated bolt serving as a joining part, which is passed through the joining hole 71 of the mount block 69 and is fastened with a nut serving as a joined part so that the mount block 69 is attached to the fixture 45.

What is claimed is:

1. An apparatus for measuring a vibration characteristic of a head gimbal assembly having a shaker head to which the head gimbal assembly is attached, comprising:
    the shaker head including a main body made of light material and a fixture solidly joined with the main body, the main body comprising a boss formed thereby and the fixture comprising a joint shaft formed thereby and protruding therefrom, the joint shaft being directly engaged with the boss of the shaker head;
    a mount block configured to hold the head gimbal assembly, the mount block be positioned and attached to the fixture;
    positioning parts formed on the fixture and the mount block, respectively, the positioning parts being positioned with each other to position the mount block to the fixture; and
    a joining part provided on the fixture and a joined part provided on the mount block, the joined part of the mount block being removably joined with the joining part of the fixture to detachably attach the mount block to the fixture.

2. The apparatus of claim 1, further comprising:
    an adhesive solidly adhering the fixture to the main body of the shaker head.

3. The apparatus of claim 1, wherein:
    the fixture is joined with the main body of the shaker head not to rotate relative to the main body.

4. The apparatus of claim 2, wherein:
    the fixture is joined with the main body of the shaker head not to rotate relative to the main body.

5. The apparatus of claim 1, further comprising:
    a first laser Doppler vibrometer configured to detect a vibration velocity of the shaker head;
    a second laser Doppler vibrometer configured to detect a vibration velocity of a head of the head gimbal assembly;
    a reflector configured to reflect a laser beam emitted from at least one of the first and second laser Doppler vibrometers into an orthogonal direction; and
    a controller configured to find the vibration characteristics of the head gimbal assembly according to the detected vibration velocities.

6. The apparatus of claim 2, further comprising:
    a first laser Doppler vibrometer configured to detect a vibration velocity of the shaker head;
    a second laser Doppler vibrometer configured to detect a vibration velocity of a head of the head gimbal assembly;
    a reflector configured to reflect a laser beam emitted from at least one of the first and second laser Doppler vibrometers into an orthogonal direction; and
    a controller configured to find the vibration characteristics of the head gimbal assembly according to the detected vibration velocities.

* * * * *